Patented Dec. 25, 1951

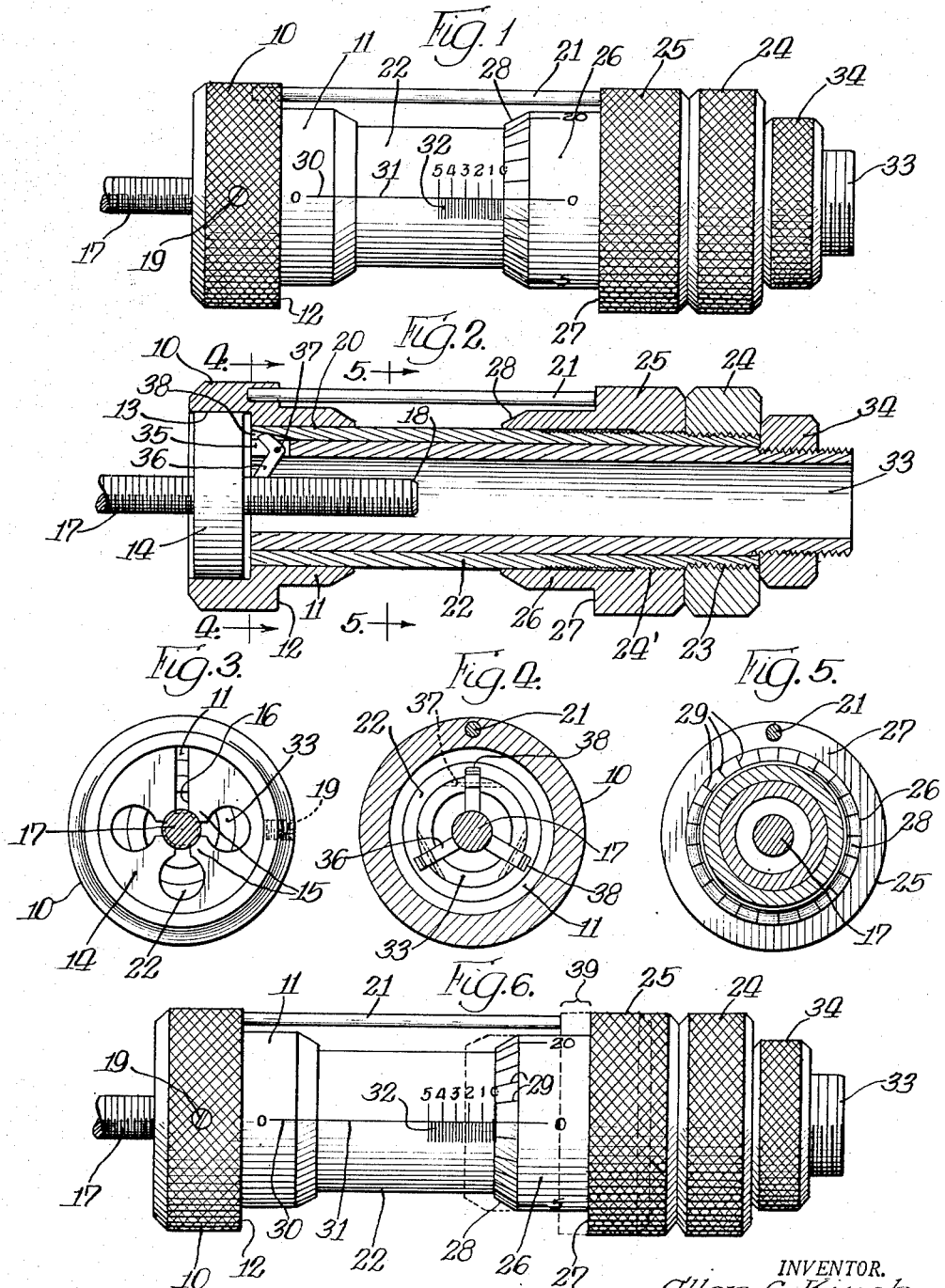

2,579,832

UNITED STATES PATENT OFFICE 2,579,832

GAUGE FOR MEASURING WIDTH AND LEAD IN SCREW THREADS

Allen C. Kinch, South Bend, Ind.

Application October 17, 1946, Serial No. 703,866

10 Claims. (Cl. 33—199)

The principal object of the present invention is the provision of a gauge instrument of a comparatively simple construction for determining with the greatest degree of accuracy and precision the pitch and the lead of a thread in any given threaded rod. By the "pitch" of a threaded rod under measurement will be understood the distance to which the gauge head described in the course of this specification will move forward on a threaded rod under measurement, if it is turned therearound one full revolution. In term of the pitch as defined, the lead of a threaded rod under measurement will be the quotient of 1 divided by the pitch.

A still further object of the present invention is the provision of a gauge of the character indicated which may be capable of exceedingly simple and easy operation, and which, with the aid of comparatively simple mathematical computation, may determine with the greatest degree of accuracy and precision the pitch or lead of a thread in any tested threaded rod.

A still further object of the present invention is the provision of a gauge for determining the unknown lead of a screw thread in terms of a known thread lead in association with the gauge.

A still further object of the present invention is the provision of a method for determining the pitch of a thread of an unknown lead in a screw rod by and with relation to a screw element having a thread of a known lead.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views:

Fig. 1 is a side elevational view of the present device, with parts thereof in the initial position preparatory to the measuring of the pitch and lead of the thread in a threaded rod, with the rod to be measured in an operative position with relation to the gauge instrument;

Fig. 2 is a cross-sectional view longitudinally of the device with parts thereof and the rod to be measured in the position identical to that in Fig. 1;

Fig. 3 is an end elevational view of the present device;

Fig. 4 is a cross-sectional view on line 4—4 of Fig. 2;

Fig. 5 is a cross-sectional view on line 5—5 of Fig. 2; and

Fig. 6 is a side elevational view of the device showing the position of parts thereof during a later stage of operation of the device.

Referring to the present drawing there is shown therein a gauge head including outwardly knurled collar 10 and an integrally formed therewith, and laterally projecting therefrom, sleeve 11, of a smaller diameter, thereby effecting a lateral shoulder 12 in said collar 10. In the hereinafter following description said collar 10 and sleeve 11 will be sometimes collectively referred to as gauge head.

Said collar 10 has bore 13 formed therewithin for selectively receiving, in a snug relation, male or female pitch diameter gauge 14, which hereinafter will be referred to as thread gauge.

Said thread gauge 14 includes a plurality of concentric jaws 15 which are threaded in conformity with the threads of a screw or a rod, the threads of which are to be measured by the present device. Said thread gauge 14 is further provided with a radial slit 16, affording a degree of resiliency to jaws 15, whereby the same tend to spring toward the center of thread gauge 14. Said thread gauge 14 is adapted to receive screw or rod 11 to be measured in threaded relation with said jaws 15. As is obvious screws or rods to be measured must necessarily be received by a particular thread gauge 14 in conformity with the particular diameter and thread pitch of the former. Thus, thread gauges of various sizes or diameters and of various thread pitches at jaws 15 may be interchangeably used in connection with the said gauge head, depending upon the particular diameter and pitch of threads of various screws or threaded rods, the threads of which are to be measured by the present device.

Since jaws 15 tend to flex toward the center of thread gauge 14, chamfer 18 of rod 17 while entering said jaws 15 will tend to spread the same, thereby bringing about a snug fit between the threads in jaws 15 and rod 17.

When rod 17 has been extended through thread gauge 14, as seen in Fig. 2, gauge 14 is ultimately inserted within bore 13 of collar 10, in a snug contacting relation with the latter and then is rigidly locked to collar 10 by set screw 19 which passes said collar 10 and by its inner end engages the periphery of said thread gauge 14.

Longitudinally sleeve 11 is provided with bore 20 which is of a diameter smaller than the diameter of bore 13 in collar 10. Both of said bores 13 and 20 intercommunicate, as seen in Fig. 2.

Anchored to collar 10, and extending in a lateral direction from shoulder 12 is rod 21, for the purpose hereinafter specified.

Receivable by one of its ends within bore 20 is barrel 22, the opposite end of which is threaded as at 23 for receiving in a threaded relation check-nut 24. Intermediately of threads 23 and its end which is receivable within sleeve 11 said barrel is provided with a series of finer threads 24' for threadedly engaging collar 25 which is outwardly knurled for facilitating manual turning thereof for rotary movement upon barrel 22. Integrally formed with said collar 25 is thimble 26 of reduced diameter which effects lateral shoulder 27. The free end of said thimble is tapered as at 28, and there a plurality of line marks 29, uniformly spaced, are made, and marked on the periphery of thimble 26 to indicate the fractional revolutions of said thimble 26 and collar 25 upon barrel 22. One of said line marks 29 is marked with zero, and hereinafter the same will be referred to as zero line. In the course of this description said collar 25 and sleeve 26 will be sometimes collectively referred to as micrometer head.

Sleeve 11 is provided with line 30 marked with zero, which in the course of this description will be referred to as zero line of the gauge head.

In a longitudinal relation barrel 22 has line 31 which in the course of this description will be referred to as the barrel zero line.

Substantially centrally thereof micrometer scale 32 is made on barrel 22, in a transverse relation with, and along said barrel zero line. Said micrometer scale includes series of calibration lines, transversely of the barrel zero line, marked with digits 0 to 5. The longer of said calibration lines represent larger inch fractions, while the intermediate ones represent still smaller inch fractions. Zero calibration line on scale 32 will register with the termination of thimble 26 when collar 25 is in contact with check-nut 24. When in that latter position the zero line on thimble 26 will be in register with the barrel zero line, as seen in Figs. 1 and 6.

It is further observed that the diameter of barrel 22 along its portion in which threads 23 are made is smaller than the remaining body position thereof for the purpose of providing clearance for collar 25 and its internal threads as the latter is inserted upon said barrel 22 and past said threads 23 preparatory to the engagement of said collar 25 with threads 24'. If preferred, said collar 25 and thimble 26 may be inserted upon barrel 22 from the end of the latter upon which collar 10 operates. At this point it is noted that check-nut 24 is longitudinally adjustable on barrel 22 and upon threads 23 for the purpose of providing a stop for collar 25 when the latter has been shifted towards the former, and when the zero line on thimble 26 is in register with barrel zero line 31, and at which time the end of thimble 26 registers with zero calibration line in micrometer scale 32.

Receivable within barrel 22 in a longitudinally shifting relation therewith is cylinder 33. One end of said cylinder 33 is threaded for receiving nut 34, by means of which, when the same is rotated in one direction, said cylinder 33 may be shifted within barrel 22 and in a longitudinal direction, away from the said gauge head.

The opposite end of said cylinder 33 is provided with a plurality of oblong recesses 35, within each of which V-shaped clamping member 36 is receivable and is there pivoted at its apex upon pin 37 which is embedded within the body portion of cylinder 33 adjacent each recess 35 and passed transversely therethrough and through each clamping member 36, as seen in Figs. 2 and 4.

Alined with each recess 35 is groove 38 made on the inner periphery of barrel 22. Each of said grooves 38 effects a tapering plane which faces the longitudinal center of barrel 22, and is in an oblique relation with the longitudinal axis of said barrel 22. The wider end of each groove 38 opens at the end of barrel 22, thereby permitting reception of the shorter, outer arm of clamping member 36 therewithin as cylinder 33 is shifted within barrel 22 in the direction away from collar 10.

When rod 17 to be measured is inserted into cylinder 33 in a longitudinal, concentric relation therewith, the outward shorter arms of clamping member 36 are made to remain within the wider, outer ends of grooves 38, with the inner longer arms thereof shifted away from said rod 17. This is accomplished by merely setting the device in a vertical position with collar 10 at the bottom, which operation will cause the longer inner arms of clamping members 36 to shift in a downward direction due to gravity, and away from the longitudinal axis of cylinder 33, thereby providing clearance for insertion of rod 17 into said cylinder 33 and of thread gauge 14 into bore 13 of collar 10. That latter downward shifting movement of the said longer, inner arms of clamping members 36 is facilitated by the fact that they are longer and therefore heavier than the opposite shorter arms thereof. The downward shifting movement of said longer, inner arms of clamping members 36 counterbalances the opposite, shorter arms of said clamping members 36 causing the latter to shift outwardly of cylinder 33 into the wider ends of grooves 38. When this has been accomplished, with rod 17 to be measured within cylinder 33 as aforesaid, nut 34 is then turned in a proper direction so as to longitudinally shift cylinder 33 within barrel 22. The abutment of nut 34 with the adjacent end of barrel 22 or of check-nut 24 prevents shifting of cylinder 33 in the opposite direction.

The shifting movement of cylinder 33 within barrel 22 by the action of nut 34 as the same is turned further, causes the tapering planes of grooves 38 to come gradually in contact with the adjacent, shorter arms of clamping members 36, shifting the inner arms thereof toward rod 17, until the said latter arms come in a strong frictional contact with said rod 17. When this is accomplished nut 34 cannot be further turned, with rod 17 remaining in a strong grip exerted thereon by said clamping members 36. This locks rod 17 to said cylinder 33 as well as to barrel 22. When this is accomplished cylinder 33 is incapable of longitudinal shifting movement within barrel 22 in either direction, because nut 34 at one end, and clamping members 36, at the other end of cylinder 33, prevent such shifting movement, said clamping members 36 being in a strong frictional engagement with barrel 22 through their shorter, outer ends and in a strong, frictional abutment with the adjacent, tapering faces of grooves 38. Neither is cylinder 33 capable of making rotary shifting movement within barrel 22, when rod 17 is locked, due to the fact that the lateral faces of grooves 38, abutting the sides of said shorter, inner arms of clamping members, interlock cylinder 33 with barrel 22 on a transverse plane.

For preparing the gauge for operation a number of steps are taken to condition the several parts of the gauge for cooperative function. The first step is to set the gauge head and the micrometer head with their zero lines in register with the zero line 31 on barrel 22, taking care that the said micrometer head is in abutment with check-nut 24 in order that the free end of thimble 26 may come in register with calibration zero line in scale 32.

The second step includes insertion of the end of rod 17 within cylinder 33, preparatory to the turning of nut 34 for clamping said rod by clamping members 36. When said rod 17 has been inserted within cylinder 33, care must be taken that zero line 30 in the gauge head and zero line in the micrometer head remain in register with the barrel zero line 31, with the free end of rod 21 in abutment with shoulder 27, as seen in Fig. 1.

While preserving the relative position of the parts of the gauge brought about by the two steps aforesaid, and as shown in Fig. 1, the third step is resorted to, namely, clamping rod 17 within clamping members 36 by turning nut 34 as hereinabove described. When this is done, all parts are brought into a mutually rigid condition, except thread gauge 14, collar 10, sleeve 11 and rod 21, said latter parts being capable of rotation in unison, but in one direction only as will be later apparent.

The fourth step in the operation of the gauge consists of manually holding check-nut 24, and while so holding the same, a rotary movement is imparted to the gauge head in the direction which will cause the disengagement of rod 21 from its abutment with shoulder 27 at collar 25. Bearing in mind that rod 17 to be measured remains stationary, and indirectly in a locked mutual relation with barrel 22, the direction of rotation of said gauge head with relation to barrel 22 will be counterclockwise, as viewed at its position in Fig. 3, in the case of right hand threads on rod 17. In the case of left hand threads on rod 17, the direction of rotation of said gauge head will be clockwise, as viewed in Fig. 3. It will therefore be seen that although said gauge head is incapable of shifting in a longitudinal direction with respect to barrel, when the parts have become mutually conditioned for the step presently under discussion, due to the threaded engagement between jaws 15 of thread gauge 14 and the rod to be measured, the same is capable however of rotary movement upon barrel 22 in that direction in which the threads upon rod 17 will permit said thread gauge 14 to rotate, depending on whether said threads are right or left hand threads. The step now under discussion contemplates rotation of the said gauge head to the extent of one or more complete revolutions. After each complete revolution of said gauge head upon barrel 22 zero line 30 will periodically come in register with barrel zero line 31, indicating completion of full revolutions of said gauge head upon barrel 22. Of course, the rotary shifting movement of said gauge head will cause the threads of thread gauge 14 to ride upon the threads of rod 17, causing shifting of said thread gauge away from the adjacent end of barrel 22. The rotary shifting movement of the said gauge head will likewise cause the shifting of rod 21 away from shoulder 27, creating a gap therebetween which is indicated by 39 in Fig. 6.

While manually holding gauge head and barrel 22 so as not to disarrange the newly established register, by virtue of the last preceding step in the operation of the gauge, between the respective zero lines, the final step in the operation of the gauge is resorted to. This final step consists of imparting a rotary movement to the micrometer head by turning collar 25 for shifting the same in the direction toward rod 21 and away from check-nut 24. In this shifting movement the micrometer head is guided by threads 24' with which collar 25 is in engagement. This shifting movement of the micrometer head shifts the thimble 26 along the calibrations of micrometer scale 32 and past the zero mark thereof, until gap 39 between the adjacent free end of rod 21 and shoulder 27 has been closed by said shoulder coming in contact with the free end of rod 21.

Bearing in mind that calibration lines on scale 32 represent the lead of threads 24' and that line marks 29 upon thimble 26 denote either complete or fractional revolutions of said thimble 26 around barrel 22, by micrometric computation it is an easy matter to determine the distance of axial movement of thimble 26 upon barrel 22 in terms of the lead of threads 24', in order to close gap 39. If the lead of threads 24' is 40 threads to an inch, then the shifting of thimble 26 from one to the adjacent calibration line upon scale 32 would advance thimble 26 1/40 of an inch, or in decimal fraction .025 of an inch.

Referring to Fig. 6, if we assume that gauge head had been revolved only once, effecting gap 39 of a breadth equivalent to 9 times .025, as indicated by the dotted lines position of the micrometer head on the micrometer scale, it follows that it would require nine complete revolutions of the micrometer head to close said gap. In this example the thread of the rod under measurement was determined to have a pitch of .225 of an inch, the product of multiplication of 9 times .025, and having approximately 4.44 threads to an inch.

If we assume however that in the last preceding example it was necessary to bring about four complete revolutions of the gauge head to effect gap 39 of .225 of an inch in breadth, then the product of the preceding example, that is .225, must be divided by 4 in order to determine the correct pitch of a thread in a rod measured, and we find that the quotient is .05625. The lead of such a thread would amount to approximately 17.80 threads per inch.

When the pitch of a thread of a rod measured has been determined, to ascertain the lead thereof, or number of its threads per inch, is a simple matter. Simply 1 is divided by the found pitch.

Thus the following simple mathematical formulas are arrived at from the examples given for determining by the present device the thread pitch or lead of any given rod under measurement:

(a)
$$p = \frac{mc}{g}$$

(b)
$$n = 1 : \frac{mc}{g}$$

wherein $p$ stands for the thread pitch in inches, $n$ stands for the lead of the screw thread or the number of threads per inch; $m$ stands for any number of revolutions, including fractions thereof, of the micrometer head required to close gap 39, as determined by the zero line of the micrometer head coming in alinement with the zero line of barrel 22 in the case of complete revolutions, and by mark lines 29 on the micrometer head coming in alinement with zero line of barrel 22 in the case of fractional revolutions of the micrometer head; c stands for the distance in inches of the space between any two adjacent calibration lines on scale 32, which necessarily must be equivalent to the pitch, in inches of a single thread of threads 24'; and g stands for the number of revolutions of the gauge head.

Obviously, threads 24' need not be of any particular lead. The same may be varied in different gauges, depending on the degree of accuracy desired, while determining leads of various threads.

From what has been said it will be seen that scale 32 is not an absolutely essential element of the invention, because for all practical purposes both complete and fractional revolutions of the micrometer head may be accurately determined by reference to the zero line of the micrometer head as it periodically comes in register with zero line 31 of barrel 22, in the case of complete revolutions, and to the remaining line marks 29 on the micrometer head coming in register with the barrel zero line, in the case of fractional revolutions. However, the use of scale 32 is helpful in that the calibration lines on said scale being numbered, they give a visual impression of the number of full revolutions of the micrometer head as the rim of the end of sleeve 26 advances upon said scale 32, without the need of actually mentally remembering the number of complete revolutions. This particularly holds true when the micrometer head is required to make a comparatively large number of revolutions to close gap 39. This need would arise when the lead of a thread under test is of a large size. If scale 32 is employed in connection with the device, it is of importance that each space defined by any two adjacent calibration lines on scale 32 should equal the pitch of threads 24'. In order to successfully use the present gauge the particular lead of threads 24' must be known, whether scale 32 is used or not, as otherwise c would be an unknown quantity and the equations aforesaid could not be solved for p or n.

From the hereinabove description of the operation of the gauge it will be seen that the pitch of a thread of a rod measured is determined by interpreting the same in terms of the lead of threads 24' upon which the micrometer head travels, which of course is a known quantity.

While there are described herein preferred embodiments of the present invention, it is nevertheless to be understood that minor changes may be made therein without departing from the spirit and scope of the invention as claimed.

What I claim as new is:

1. A gauge for measuring the width and lead of a screw threaded rod comprising a barrel having external threads at one of its ends, a collar rotatably mounted on said barrel on the other of its ends, said collar being movable longitudinally of said barrel, a rod having one of its ends fixedly mounted on said collar and extending parallel to the axis of said barrel, said barrel having a plurality of external threads formed thereon of known lead, gauging means engaging said screw threaded rod, means securing said gauging means within said collar, a sleeve telescoped within said barrel and having a threaded end projecting beyond said threaded end of said barrel, clamping means mounted within the other end of said sleeve for engagement with said screw threaded rod, means coacting with said threaded end of said sleeve to effect said last named clamping engagement, a second collar mounted on said barrel, said second collar having internal threads corresponding to and coacting with said external threads formed on said barrel having a known lead, said second collar having a radial shoulder aligned with and engageable by the other end of said rod, a lock nut on said first named threads formed on said collar for holding said second collar in adjusted position on said barrel, and means on said first collar and barrel indicating one full revolution of said first collar about said screw threaded rod whereby said second rod is moved a given distance away from said shoulder, and means on said barrel and said second collar for indicating the number of revolutions or fractions thereof of said second collar on said barrel to close the gap between said shoulder and said other end of said second rod.

2. A gauge for measuring the width and lead of a screw threaded rod comprising a barrel having external threads at one of its ends, a collar rotatably mounted on said barrel on the other of its ends, said collar being movable longitudinally of said barrel, a rod having one of its ends fixedly mounted on said collar and extending substantially parallel to the axis of said barrel, said barrel having a plurality of external threads formed thereon of known lead, gauging means engaging said screw threaded rod, said gauging means comprising a plurality of concentric jaws threaded in conformity with the threads of said screw threaded rod, means securing said gauging means within said collar, a sleeve telescoped within said barrel and having a threaded end projecting beyond said threaded end of said barrel, said sleeve being rotatably and slidably mounted within said barrel, clamping means mounted within the other end of said sleeve for engagement with said screw threaded rod, means coacting with said threaded end of said sleeve to effect said last named clamping engagement, a second collar mounted on said barrel, said second collar having internal threads corresponding to and coacting with said external threads formed on said barrel having a known lead, said second collar having a radial shoulder aligned with and engageable by the other end of said rod, means cooperating with said first named threads formed on said barrel for holding said second collar in adjusted position on said barrel, means cooperating with said first collar and barrel to indicate one full revolution of said first collar about said screw threaded rod whereby said second rod is moved a given distance away from said shoulder, and means cooperating with said barrel and said second collar to indicate the number of revolutions or fractions thereof of said second collar on said barrel to close the gap between said shoulder and said other end of said second rod.

3. A gauge for measuring the width and lead of a screw threaded rod comprising a barrel having external threads at one of its ends, a collar rotatably mounted on said barrel on the other of its ends, said collar being movable longitudinally of said barrel, a rod having one of its ends fixedly mounted on said collar and extending substantially parallel to the axis of said barrel, said barrel having a plurality of external threads formed thereon of known lead, gauging means engaging said screw threaded rod, means securing said gauging means within said collar, a sleeve telescoped within said barrel and having a threaded end projecting beyond said threaded end of said barrel, said sleeve being rotatably and slidably mounted within said barrel, clamping means mounted within the other end of said sleeve for engagement with said screw threaded rod, means coacting with said threaded end of said sleeve to effect said last named clamping engagement, a second collar mounted on said barrel, said second collar having internal threads corresponding to and coacting with said external threads formed on said barrel having a known lead, said second collar having a radial shoulder aligned with and engageable by the other end of said rod, means cooperating with said first named threads formed on said barrel for holding said second collar in adjusted position on said barrel, means indicating one full revolution of said first collar about said screw threaded rod whereby said second rod is moved a given distance away from said shoulder, and means indicating the number of revolutions or fractions thereof of said second collar on said barrel to close the gap between said shoulder and said other end of said second rod.

4. A gauge for measuring the width and lead of a screw threaded rod comprising a barrel having external threads at one of its ends, a collar rotatably mounted on said barrel on the other of its ends, said collar being movable longitudinally of said barrel, a rod having one of its ends fixedly mounted on said collar and extending substantially parallel to the axis of said barrel, said barrel having a plurality of external threads formed thereon of known lead, gauging means engaging said screw threaded rod, said gauging means comprising a plurality of concentric jaws threaded in conformity with the threads of said screw threaded rod, means securing said gauging means within said collar, means within said barrel engaging said screw threaded rod to prevent relative rotation thereof, a second collar mounted on said barrel, said second collar having internal threads corresponding to and coacting with said external threads formed on said barrel having a known lead, said second collar having a radial shoulder aligned with and engageable by the other end of said rod, means cooperating with said first named threads formed on said barrel for holding said second collar in adjusted position on said barrel, means cooperating with said first collar and barrel to indicate one full revolution of said collar about said screw threaded rod whereby said second rod is moved a given distance away from said shoulder, and means cooperating with said barrel and said second collar to indicate the number of revolutions or fractions thereof of said second collar on said barrel to close the gap between said shoulder and said other end of said rod.

5. A gauge for measuring the width and lead of a screw threaded rod comprising a barrel, a collar rotatably mounted on said barrel on one of its ends, said collar being movable longitudinally of said barrel, a rod having one of its ends fixedly mounted on said collar and extending parallel to the axis of said barrel, said barrel adjacent one of its ends having a plurality of external threads formed thereon of known lead, gauging means engaging said screw threaded rod, means securing said gauging means within said collar, a sleeve telescoped within said barrel and having an end projecting beyond said one end of said barrel, clamping means mounted within the other end of sleeve for engagement with said screw threaded rod, means coacting with said one end of said sleeve to effect said last named clamping engagement, a second collar mounted on said barrel, said second collar having internal threads corresponding to and coacting with said external threads formed on said barrel having a known lead, said second collar having a radial shoulder aligned with and engageable by the other end of said rod, and means coacting with said first collar to indicate one full revolution thereof about said screw threaded rod whereby said second rod is moved a given distance away from said shoulder, and means coacting with said second collar to indicate the number of revolutions or fractions thereof required of said second collar to close the gap between said shoulder and said other end of said second rod.

6. A gauge for measuring the width and lead of a screw threaded rod comprising a barrel having a collar rotatably mounted on one of its ends, said collar being movable longitudinally of said barrel, an elongated rigid rod element having one of its ends fixedly mounted on said collar, said barrel having a plurality of external threads formed thereon of known lead, means within said collar threadly engaging said screw threaded rod, means securing last named means within said collar, an elongated element positioned within said barrel, clamping means mounted on one end of said element for engagement with said screw threaded rod, means adjacent the other end of said element to effect said last named clamping engagement, a second collar mounted on said barrel, said second collar having internal threads corresponding to and coacting with said external threads formed on said barrel having a known lead, said second collar having a radial shoulder aligned with and engageable by the other end of said second rod, means for holding said second collar in an adjusted position on said barrel, and means coacting with said first collar to indicate one full revolution of said first collar about said screw threaded rod whereby said other end of said second rod is moved away from said shoulder, and means on said second collar to indicate the number of revolutions or fractions thereof required by said second collar on said barrel to close the gap between said shoulder and said other end of said second rod.

7. A gauge for measuring the width and lead of a screw threaded rod comprising an elongated hollow cylinder having a collar rotatably mounted thereon adjacent one of its ends, said collar movable longitudinally of said cylinder, said cylinder having a plurality of external threads formed thereon of known lead, gauging means positioned in said collar engaging said screw threaded rod, a sleeve telescoped within said cylinder and having one end thereof projecting beyond said other end of said cylinder, said sleeve being rotatably and slidably mounted within said cylinder, clamping means mounted adjacent the other end of said sleeve for engagement with said screw threaded rod, means coacting wth said one end of said sleeve to effect said last named clamping engagement, a second collar mounted on said cylinder, said second collar having internal threads corresponding to and coacting with said external threads formed on said cylinder having a known lead, means cooperating with said first collar and cylinder to indicate one full revolution of said first collar about said screw threaded rod whereby said first collar is moved a distance away from said second collar, and means cooperating with said cylinder and said second collar to indicate the number of revolutions or fractions thereof required by said second collar on said cylinder to move said second collar an equivalent distance toward said first collar.

8. A gauge for measuring the width and lead of a screw threaded rod comprising a barrel, a collar rotatably mounted on said barrel on one of its ends, said collar being movable longitudinally of said barrel, said barrel having a plurality of external threads formed thereon of known lead, detachable means within said collar engaging said screw threaded rod, an elongated member disposed within said barrel, clamping means mounted on one end of said member for engagement with said screw threaded rod, means positioned on the other end of said member to effect said last named clamping engagement, a second collar mounted on said barrel, said second collar having internal threads corresponding to and coacting with said external threads formed on said barrel, and means coacting with said first collar to indicate one full revolution of said first collar about said screw threaded rod whereby said first collar is moved a distance away from said second collar, and means on said second collar to indicate the number of revolutions or fractions thereof required by said second collar to move an equivalent distance toward said first collar.

9. A gauge for measuring the width and lead of a screw threaded rod comprising a barrel, a collar rotatably mounted on said barrel adjacent one of its ends, said collar being movable longitudinally of said barrel, said barrel adjacent the other of its ends having a plurality of external threads formed thereon of known lead, threaded gauging means within said collar engaging the threads of said screw threaded rod, screw threaded means positioned within said barrel engaging said rod to prevent relative rotation thereof, a second collar mounted on said barrel, said second collar having internal threads corresponding to and coacting with said external threads formed on said barrel, and means coacting with said first collar to indicate one full revolution thereof about said screw threaded rod whereby said first collar is moved away from said second collar, and means coacting with said second collar to indicate the number of revolutions or fractions thereof required by said second collar to move said second collar an equal distance toward said first collar.

10. A gauge for measuring the width and lead of a screw threaded rod comprising an elongated externally threaded cylinder, means rotatably mounted on one end of said cylinder and engaging said screw threaded rod, said means moving longitudinally of said cylinder during rotation thereof, rotatable means within said cylinder engaging said screw threaded rod to prevent relative rotation thereof, a member rotatably mounted on said cylinder and having internal threads corresponding to and coacting with said external threads formed on said cylinder, means cooperating with said first means to indicate one full revolution thereof about said screw threaded rod whereby said first means is moved a distance away from said member, and means indicating the number of revolutions or fractions thereof required by said member to move an equivalent distance toward said first means.

ALLEN C. KINCH.

REFERENCES CITED

The following references are of record in the file of this patent:

UNITED STATES PATENTS

| Number | Name | Date |
| --- | --- | --- |
| 1,357,588 | Peck | Nov. 2, 1920 |
| 1,535,098 | Buckingham | Apr. 28, 1925 |
| 1,543,244 | Blood | June 23, 1925 |
| 2,391,590 | Pantages | Dec. 25, 1945 |

OTHER REFERENCES

"Supplement to Screw-Thread Standards for Federal Services," issued June 15, 1949, available from Supt. of Documents, U. S. Govt. Printing Office, Washington 25, D. C.